(12) United States Patent
Yamamoto et al.

(10) Patent No.: US 10,305,913 B2
(45) Date of Patent: May 28, 2019

(54) AUTHENTICATION CONTROL DEVICE AND AUTHENTICATION CONTROL METHOD

(71) Applicant: FUJITSU LIMITED, Kawasaki-shi, Kanagawa (JP)

(72) Inventors: Kan Yamamoto, Numazu (JP); Ryohei Morishita, Yokohama (JP); Hiroyoshi Kasai, Yokohama (JP); Norie Tachibana, Kawasaki (JP); Norihiko Igarashi, Kawasaki (JP); Masatomo Yasaki, Kako (JP); Ryoichi Akiyama, Kagoshima (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 15/281,170

(22) Filed: Sep. 30, 2016

(65) Prior Publication Data

US 2017/0149790 A1    May 25, 2017

(30) Foreign Application Priority Data

Nov. 20, 2015    (JP) ................. 2015-227697

(51) Int. Cl.
*H04L 29/06* (2006.01)
*G06F 21/62* (2013.01)
*G06F 21/44* (2013.01)

(52) U.S. Cl.
CPC ............ *H04L 63/102* (2013.01); *G06F 21/44* (2013.01); *G06F 21/629* (2013.01);
(Continued)

(58) Field of Classification Search
CPC .............. H04L 63/102; H04L 63/0876; H04L 63/0807; H04L 63/0884; H04L 2463/082;
(Continued)

(56) References Cited

U.S. PATENT DOCUMENTS

| | | | | |
|---|---|---|---|---|
| 2005/0144133 A1* | 6/2005 | Hoffman | ................ | C07K 14/53 705/50 |
| 2015/0347611 A1* | 12/2015 | Holt | ........................ | H04L 67/02 715/234 |
| 2017/0093827 A1* | 3/2017 | Pandian | .................. | H04L 63/08 |

FOREIGN PATENT DOCUMENTS

WO    2009-001447    12/2008

* cited by examiner

*Primary Examiner* — Joseph P Hirl
*Assistant Examiner* — Chi D Nguy
(74) *Attorney, Agent, or Firm* — Fujitsu Patent Center

(57) ABSTRACT

The resolution of the problem is achieved by performing a first determination process in which when request information is received, validity of the request information is determined on the basis of identification information of the interface included in the request information and a second determination process in which validity of the request information is determined on the basis of key information or authentication token information for an interface included in the request information and that permits a user who made the application to utilize the interface or the authentication token information that determines the validity of the user; and transmitting to a transmission source of the request information and regardless of a result of the first determination process, error information indicating that an access is not allowed when the request information is determined to be not valid as a result of the second determination process.

3 Claims, 8 Drawing Sheets

(52) U.S. Cl.
CPC ...... *H04L 63/0807* (2013.01); *H04L 63/0876* (2013.01); *H04L 63/0884* (2013.01); *G06F 2221/2115* (2013.01); *H04L 2463/082* (2013.01)

(58) Field of Classification Search
CPC ..... H04L 63/082; G06F 21/44; G06F 21/629; G06F 2221/2115
See application file for complete search history.

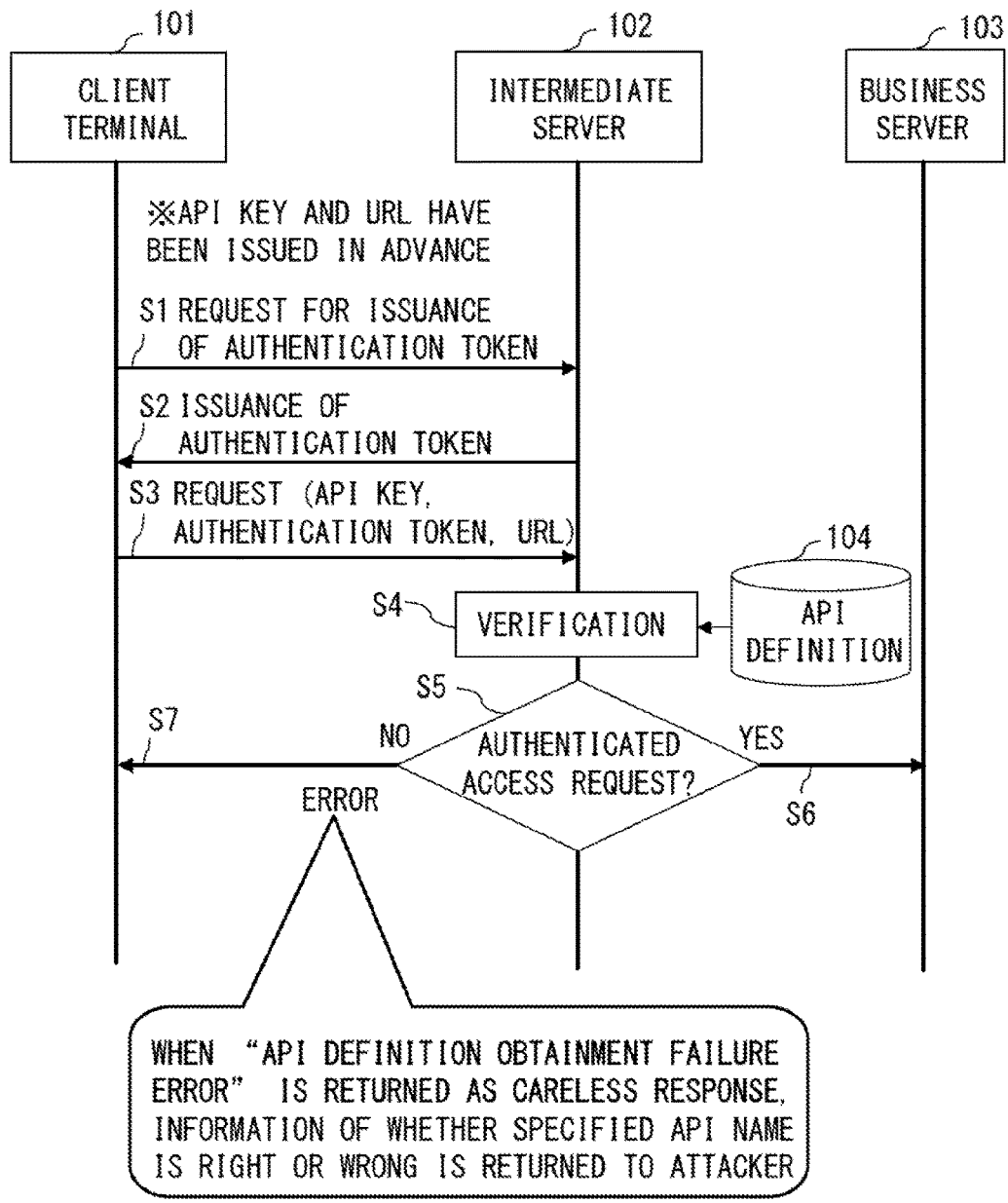
F I G. 1

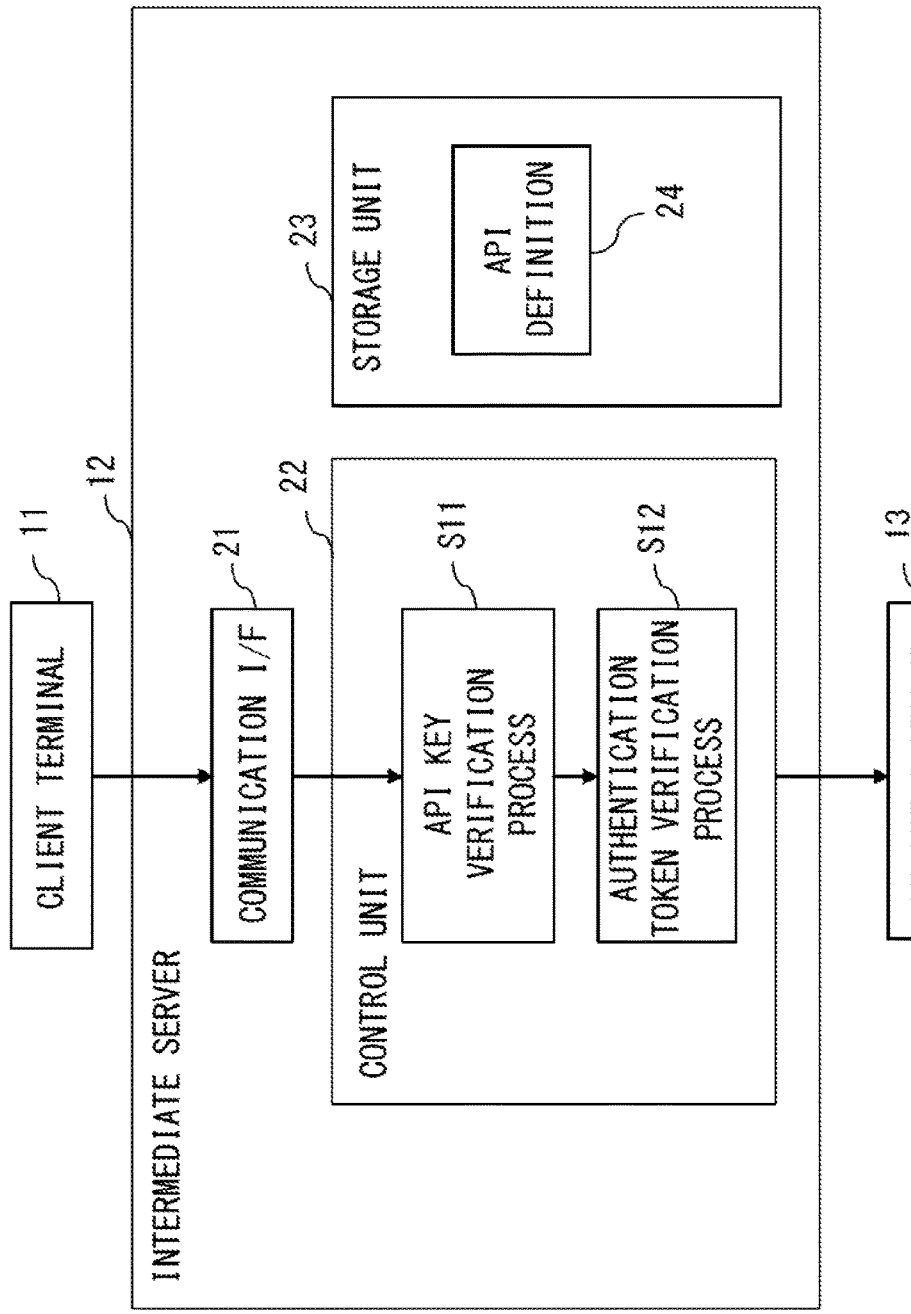
F I G. 4

FIG. 5A

- FORMAT OF URL TRANSMITTED FROM CLIENT https://FQDN NAME OF INTERMEDIATE SERVER: PORT NUMBER /api/<tenantkey>/<apiname>/<resource>

FIG. 5B

| PARAMETER | REQUEST HEADER |
|---|---|
| API KEY | X-API-Key |
| AUTHENTICATION TOKEN | X-Token |

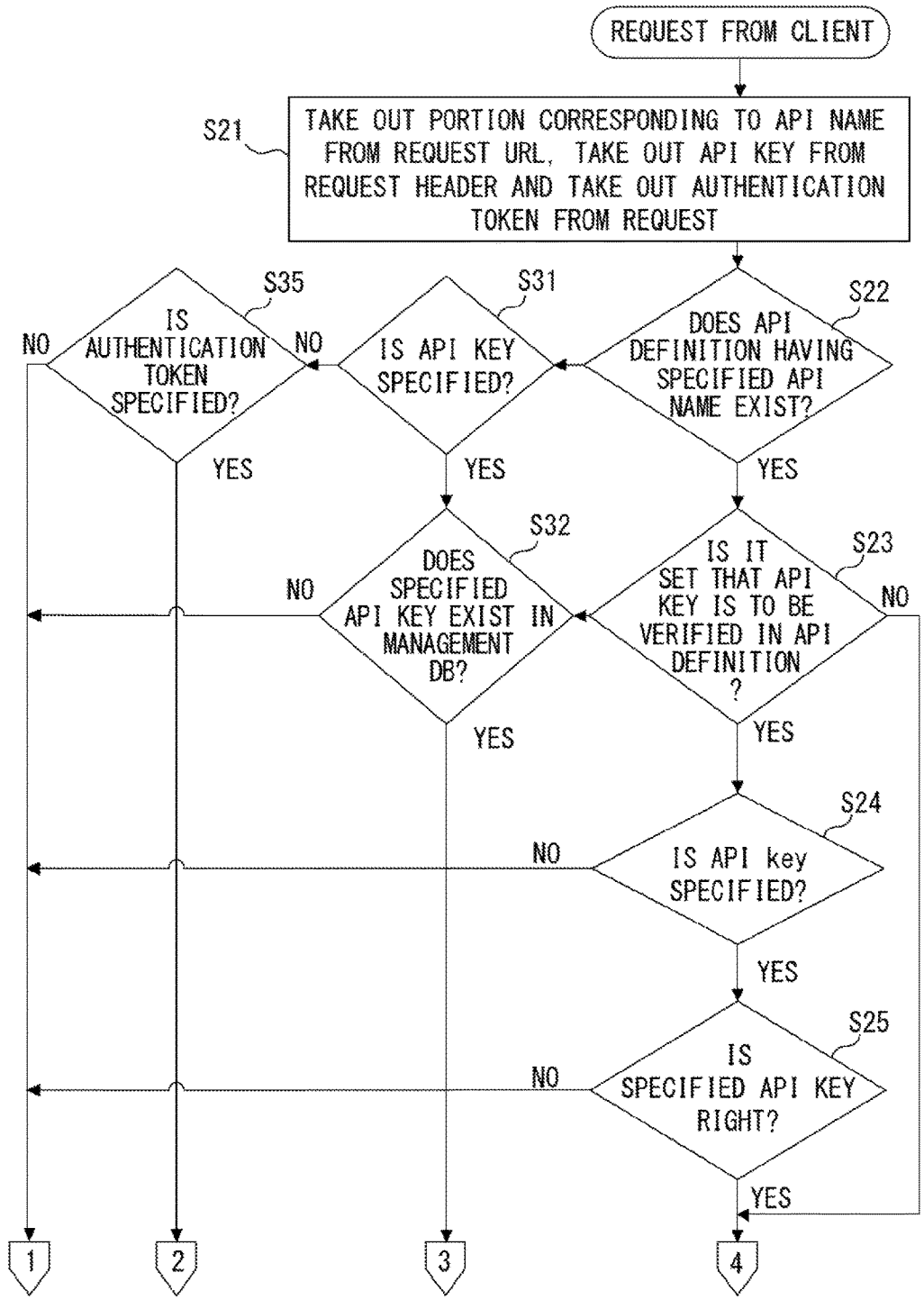
F I G. 6 A

AUTHENTICATION CONTROL DEVICE AND AUTHENTICATION CONTROL METHOD

CROSS-REFERENCE TO RELATED APPLICATION

This application is based upon and claims the benefit of priority of the prior Japanese Patent Application No. 2015-227697, filed on Nov. 20, 2015, the entire contents of which are incorporated herein by reference.

FIELD

The embodiments discussed herein are related to an authentication control device and an authentication control method.

BACKGROUND

There is a need to cause a revolutionary change to work styles by utilizing a business system existing in a company from mobile terminals in a novel manner. In such a case, new access routes are prepared between mobile terminals outside a company to the business system in the company.

Newly providing a route that is accessed from a network open to the external environment such as the Internet to a business system that has been used in a closed environment in a company, i.e., a safe network leads to an increased risk of receiving attacks from attackers outside the company. This increases a risk that information in the business system will be exposed.

Patent document 1: International Patent Application Publication No. 2009/001447

SUMMARY

According to an aspect of the present invention, a computer is caused to execute the following processes. Specifically, the computer executes first and second determination processes when request information requesting function of application software or an interface that calls data is received. The first determination process is a process in which validity of the request information is determined on the basis of identification information of the interface included in the request information. The second determination process is a process in which validity of the request information is determined on the basis of key information, authentication token information for an interface included in the request information or any combination thereof. The key information is information for permitting, regarding an application to utilize the interface, a user who made the application to utilize the interface. The authentication token information is information that determines the validity of the user. The computer transmits, to a transmission source of the request information and regardless of a result of the first determination process, error information indicating that an access is not allowed when the request information is determined to be not valid as a result of the second determination process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a sequence of an access from a client terminal to a business server in a business system in which client terminals and the business server communicate via an intermediate server;

FIG. 4 illustrates an example of an intermediate server in the present embodiment;

FIG. 5A illustrates an example of request information transmitted from a client terminal according to the present embodiment;

FIG. 5B illustrates an example of request information transmitted from a client terminal according to the present embodiment;

FIG. 6A illustrates a flow of the verification process in S11 and s12 according to the present embodiment (first);

DESCRIPTION OF EMBODIMENTS

Figure 2:
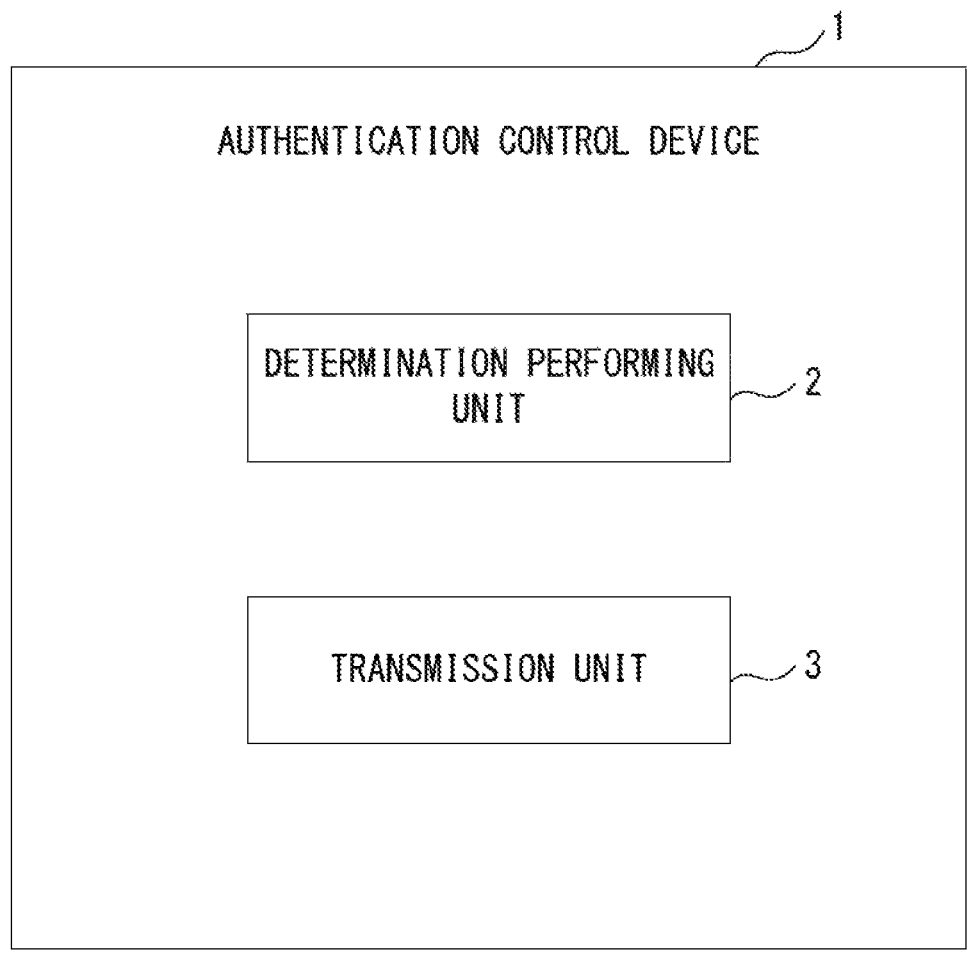
FIG. 2 illustrates an example of an authentication control device according to the present embodiment.

A method may be possible in which the above business system is protected by introducing a configuration including an intermediate system having a function of user authentication, access log collection, etc. between mobile terminals and the business system not open to the external environment so as to prevent an access to the business system that has not passed through the intermediate server.

However, because that intermediate server is made open on a network such as the Internet etc. and may receive unauthenticated accesses from outside attackers, unauthenticated accesses have to be taken into consideration.

When for example an attacker makes an unauthenticated access and that access is not allowed by the authentication mechanism on the system side, error information is returned to the accessing side. However, when for example error information includes information that is advantageous to the attacker in view of security, there is a possibility that the attacker will pass through the authentication mechanism by utilizing such information. As described above, even when the authentication mechanism transmits error information in response to an unauthenticated access so as to refuse the access, a risk still remains that the attacker makes a further attack by using information included in that error information.

Examples in which unauthenticated accesses have to be taken into consideration may include the following situations.

FIG. 1 illustrates a sequence of an access from a client terminal to a business server in a business system in which client terminals and the business server communicate via an intermediate server.

In the business system illustrated in FIG. 1, it is assumed that only an application program interface (API) can be utilized, the application program interface being registered in advance for an application program capable of communicating with a business server 103 that can be utilized by a client terminal 101.

In such a case, the user of the client terminal 101 (for example, the developer of the calling program) has to submit, to the API administrator in advance, a utilization application for the API that is to be utilized. Then, the API administrator registers the definition (API definitions) of that API for example in a storage device of an intermediate server 102.

Further, the API administrator issues, to the user of the client terminal 101, an API key and a uniform resource locator (URL) representing the reference destination for that API when that API is utilized. An API key is key information representing that the calling program has the authority to utilize the API corresponding to a registered API definition.

When that API is utilized in the client terminal 101 and it is requested that the API key be specified in the API definition, the client terminal 101 has to transmit that API key and its URL to the intermediate server 102 as illustrated in FIG. 1.

In FIG. 1, it is assumed that the API key for an application program (referred to as an "application" hereinafter) that is to be utilized and its URL have already been issued to the client terminal 101.

First, upon transmission of request information (i.e., a request) from the client terminal 101 to the business server 103, the client terminal 101 requests that the intermediate server 102 issue an authentication token (S1). Then, the intermediate server 102 issues an authentication token to the client terminal 101 (S2). An authentication token is information for determining the validity of the user. In the present embodiment, an authentication token is information for determining a user having the authority to utilize a computer service, and is information for determining whether or not the accessing user is a valid user, who has been given the utilization authority in advance, in the authentication process on the server side.

The client terminal 101 transmits request information (referred to as a "request" hereinafter) to the intermediate server 102 in order to access the business server 103 (S13). This request is for example a Hypertext Transfer Protocol (HTTP) request message, and includes the API key and the URL held by the client terminal 101 in advance and the authentication token obtained in S2.

Receiving the request from the client terminal 101, the intermediate server 102 extracts the API key, the authentication token and the URL included in the request. On the basis of the API key, the authentication token and the URL, the intermediate server 102 verifies the validity of the user and the validity of the requested API.

In the verification of a requested API, whether or not the API key included in the request is valid and whether or not the API name specified in the URL exits are confirmed on the basis of an API definition 104.

When the verification of the validity of the user and the verification of the validity of the API succeed (Yes in S5), the intermediate server 102 accesses an business server 3 through encrypted communications on the basis of the request from the client terminal 101.

When the verification of the validity of the user and the verification of the validity of the API failed (No in S5), the intermediate server 102 perform error reporting to the client terminal 101 (S7). When the API name specified in the URL does not exist in a case when the API key specified by the request is not valid or the API key is not specified, the intermediate server 102 reports an API definition obtainment failure error to the client terminal 101.

As described above, returning an API definition obtainment failure error to an attacker as a careless response gives the attacker information regarding whether the specified API name is "right" or "wrong". Accumulation of such pieces of information on the attacker side leads to a risk to the security.

In view of the above, the present embodiment introduces a configuration that does not make a careless response to unauthenticated accesses that was made to the intermediate server. This can suppress exposure of information advantageous to the attacker regarding unauthenticated accesses to the intermediate server 102 during the utilization of client terminals of a business server.

FIG. 2 illustrates an example of an authentication control device according to the present embodiment. An authentication control device 1 includes a determination performing unit 2 and a transmission unit 3.

Receiving request information requesting a function of application software or utilization of an interface for calling data, the determination performing unit 2 performs first and second determination processes. An example of the determination performing unit 2 is a control unit 22, which will be described later.

In the first determination process, the determination performing unit 2 determines the validity of request information on the basis of the identification information of an interface included in the request information. An example of the first determination process is the process in S22, which will be described later.

In the second determination process, the determination performing unit 2 determines the validity of the request information on the basis of at least one of the pieces of key information and the authentication token regarding the interface included in the request information. Key information is information that allows the user who made a utilization application for an interface to utilize the interface, in response to the utilization application for the interface. Authentication token information is information for determination of the validity of the user. Examples of the second determination process are the processes in S25 and s28, which will be described later.

When the request information is determined to be not valid as a result of the second determination process, the transmission unit 3 transmits information indicating that the access is not allowed, to the transmission source of the request information and regardless of the result of the first determination process. Error information is information that does not include information for identifying the cause of the error and that represents only the fact that the access is not allowed. Examples of the determination performing unit 2 are the processes in S37 and s38 performed by the control unit 22, which will be described later.

This configuration makes it possible to prevent the provision of information advantageous to the attacker in the response to unauthenticated accesses.

Hereinafter, the present embodiment will be explained in more detail.

Figure 3:
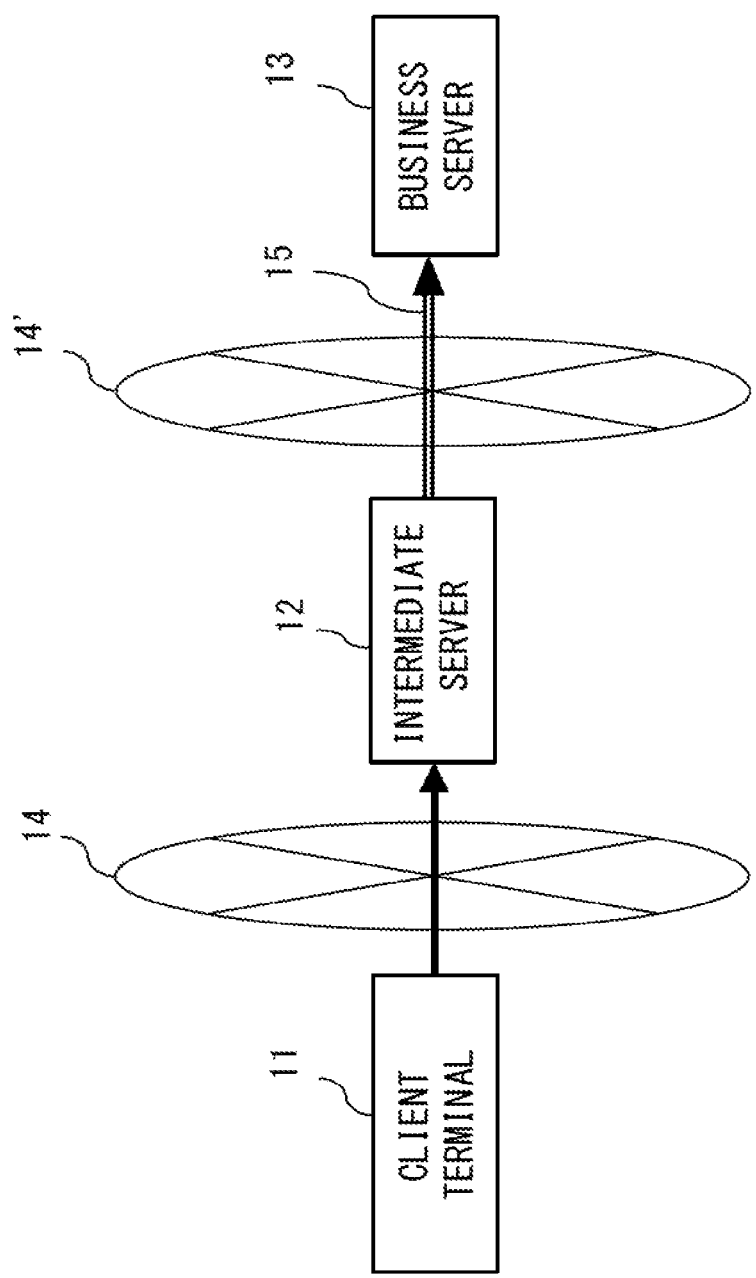
FIG. 3 illustrates an example of a network configuration of the present embodiment.

FIG. 3 illustrates an example of a network configuration of the present embodiment. A client terminal 11, an intermediate server 12 and a business server 13 are connected to open networks 14 and 14' such as the Internet. Note that while the networks 14 and 14' are the same network, they are treated as separate ones for the sake of convenience.

The business server 13 is a server (or a server system) utilized in a company. The business server 13 is connected to the network 14'. However, it is not able to access the business server 13 directly from the network 14' except from the business server 13 itself. In other words, it is possible to access the business server 13 from the outside only through the intermediate server 12 as will be described later.

The client terminal 11 is for example an information communication terminal utilized by a user working for the company, and can perform communications via a network. Note that the information communication terminal may be connected to the network 14 in a wireless or wired manner.

The intermediate server 12 is a gateway server that is logically provided on the communication route between the client terminal 11 and the business server 13 and that has functions of user authentication, access log collection, etc. An encrypted communication 15 is performed between the intermediate server 12 and the business server 13.

Also, it is assumed in the present embodiment that only an application program interface (API) can be utilized, the application program interface being registered in advance for an application program capable of communicating with the business server 13 that can be utilized by the client terminal 11 as illustrated in FIG. 1.

It is also assumed in the present embodiment that the API key of an application that is to be utilized and the URL thereof have already been issued to the client terminal 11.

FIG. 4 illustrates an example of an intermediate server in the present embodiment. The intermediate server 12 includes a communication interface (I/F) 21, the control unit 22 and a storage unit 23.

The client terminal 11 transmits a request to the intermediate server 12. The request includes information regarding the API key, the authentication token and the URL.

The communication I/F 21 is an interface for the connection to the network 14. The communication I/F 21 obtains a request transmitted from the client terminal 11 and transmits a response to the client terminal 11.

The storage unit 23 stores an API definition 24. The API definition 24 is information regarding a definition corresponding to each API registered in advance in response to an API utilization application as described above.

The control unit 22 is a processor that controls the entire operation of the intermediate server 12. The control unit 22 performs the API key verification process (S11) and the verification process of an authentication token (S12).

In the API key verification process (S11), the control unit 22 verifies whether or not the API key included in a request transmitted from the client terminal 11 is valid. When it is set that the API key is to be verified in the API definition and when it is not possible to obtain an API definition, the control unit 22 performs the verification in S11. When it is set that the API key is not to be verified in the API definition, the control unit 22 performs the verification process of an authentication token (S12).

The reasons for performing verification when an API definition is not obtained are:
that there is a possibility of the API key having been set in the request even when an API definition is not obtained; and
that in case of an verification error of an API key, it is needed to treat it as a permission error instead of an API definition obtainment failure error in view of the URI (uniform resource identifier) protection.

When the control unit 22 verifies an API key, the control unit 22 performs, in response to a request for an API (in response to API calling), a confirmation process of whether or not an API key is set in the request and confirms whether or not the set API key is normal.

In the verification process of an authentication token (S12), whether or not the authentication token included in a request transmitted from the client terminal 11 is valid is verified by inquiring of an authentication server (not illustrated). Note that the authentication server may be included in the intermediate server 12 or may be an external server.

When it is set that the authentication token is to be verified in the API definition 24 and when it is not possible to obtain the API definition 24, the control unit 22 performs the verification in S12.

The reasons for performing verification when it is not possible to obtain the API definition 24 are:
that there is a possibility of the authentication token having been set in the request even when the API definition is not obtained; and
that in case of a verification error of an authentication token, it is needed to treat it as an authentication error instead of an API definition obtainment failure error in view of the URI protection.

When it is set that the authentication token is to be verified, the control unit 22 performs, in response to a request for an API (in response to API calling), a confirmation process of whether or not an authentication token is set in the request, and performs the verification of the authentication token and a confirmation process of the user information.

When the verification processes in S11 and s12 succeed, the control unit 22 accesses the business server 13 via an encrypted communication on the basis of a request from the client terminal 11.

FIG. 5 illustrates an example of request information transmitted from a client terminal according to the present embodiment. FIG. 5 uses an example of an HTTP request message.

FIG. 5A illustrates a format example of a URL included in a request transmitted from the client terminal 11. "<tenantkey>" in this example is information for identifying each tenant (such as a company user etc.) in a multi-tenant environment. "<apiname>" is an API name. "<resource>" is information representing the location of a reference destination. Note that FQDN is an abbreviation for "Fully Qualified Domain Name".

In the process of the intermediate server 12, the API name is obtained from the portion corresponding to <apiname> in the above URL format.

FIG. 5B illustrates header information (request header) included in a request transmitted from the client terminal 11.

An API key is obtained by the control unit 22 from for example item "X-API-Key" included in the request header. An API key is a unique piece of information issued in advance in response to the application for the utilization of the business server 13. For example, the developer of a program calling the business server obtains the API key from the API management portal server in advance so as to embed the API key in the calling program. When for example it is defined that the API key is to be verified in the API definition, the API key needs to be specified in the request header.

An authentication token is obtained by the control unit 22 from for example item "X-Token" included in the request header. An authentication token is a unique piece of information used for user authentication. An authentication token is obtained by logging on to the authentication server before calling the API. When for example it is defined that the authentication token is to be verified in the API definition, the authentication token needs to be specified in the request header.

Figure 6B:
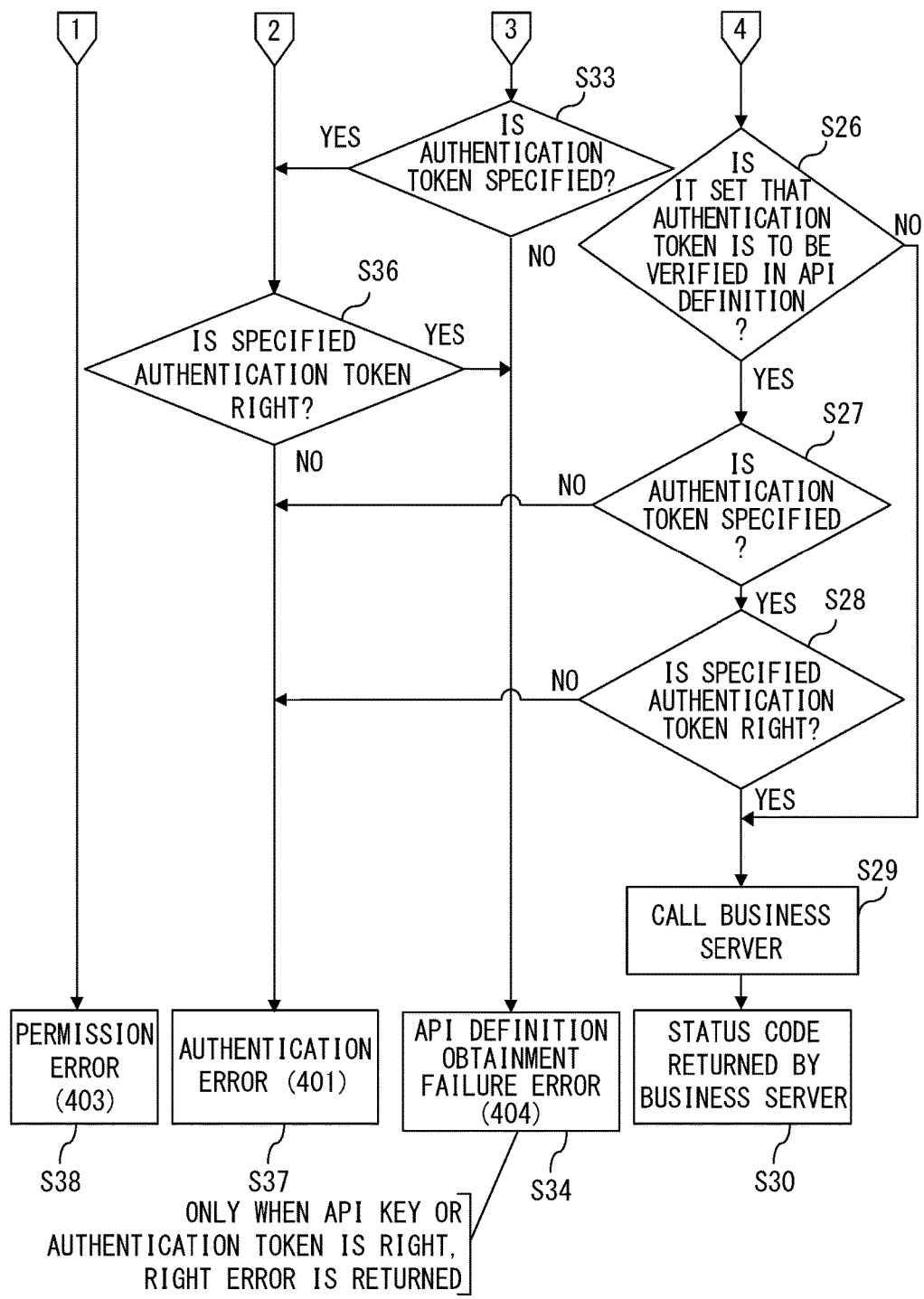
FIG. 6B illustrates a flow of the verification process in S11 and s12 according to the present embodiment (second)

FIG. 6A and FIG. 6B illustrate a flow of the verification process in S11 and s12 according to the present embodiment. Receiving a request from the client terminal 11, the control unit 22 performs the following processes.

First, the control unit 22 extracts the URL from the received request, and takes out the portion corresponding to the API name from the URL. Also, the control unit 22 takes out the portion corresponding to the API key and the portion corresponding to the authentication token from the request header of the received request (S21).

The control unit 22 determines, on the basis of the API name that was taken out, whether or not an API definition corresponding to the API name specified by the URL exists (S22).

When an API definition corresponding to the API name specified by the URL exists (Yes in S22), the control unit 22 determines whether or not it is set that the API key is to be verified in the API definition (S23).

When it is not set that the API key is to be verified in the API definition (No in S23), the control unit 22 performs the process in S26. When it is set that the API key is to be verified in the API definition (Yes in S23), the control unit 22 determines whether or not the API key is specified in the request head. When the portion corresponding to the API key was taken out in S21, the control unit 22 determines that the API key is specified in the request header.

When the API key is not specified in the request header (No in S24), the control unit 22 returns permission error (403) to the client terminal 11 (S38).

When the API key is specified in the request header (Yes in S24), the control unit 22 determines whether or not the specified API key is right (S25). In this example, when API key information is obtained from the management DB by using the specified API key as a search key, the control unit 22 determines whether or not "<tenantkey>/<apiname>" set in the URL is identical to "<tenantkey>/<apiname>" in the obtained API key. When "<tenantkey>/<apiname>" set in the URL is identical to "<tenantkey>/<apiname>" in the obtained API key information, the control unit 22 determines the specified API key to be right.

Note that the management DB is a database for managing API keys issued to users, and is stored in the storage unit 23 of the intermediate server 12 or in an external server.

When the specified API key is right (Yes in S25), the control unit 22 performs the process in S26. When the specified API key is not right (No in S25), the control unit 22 returns permission error (403) to the client terminal 11 (S38).

When the result in S25 is Yes or when the result in S23 is No, the control unit 22 determines whether or not it is defined that the authentication token is to be verified in the API definition (S26). When it is not set that the authentication token is to be verified in the API definition (No in S23), the control unit 22 performs the process in S29.

When it is set that the API key is to be verified in the API definition (Yes in S26), the control unit 22 determines whether or not the authentication token is specified in the request header (S27). When the portion corresponding to the authentication token was taken out in S21, the control unit 22 determines that the authentication token is specified in the request header.

When the authentication token is not specified in the request header (No in S27), the control unit 22 returns authentication error (401) to the client terminal 11 (S37).

When the authentication token is specified in the request header (Yes in S27), the control unit 22 determines whether or not the specified authentication token is right by inquiring of the authentication server (S28).

When the specified authentication token is not right (No in S28), the control unit 22 returns authentication error (401) to the client terminal 11 (S37). When the specified authentication token is right (Yes in S28), the control unit calls the business server (S29). The business server returns a status code in response to that call (S30).

When the API definition corresponding to the API name specified in the URL does not exist in S22 (No in S22), the control unit 22 determines whether or not the API key is specified in the request header (S31). When the portion corresponding to the API key was taken out in S21, the control unit 22 determines that the API key is specified in the request header.

When the API key is not specified in the request header (No in S31), the control unit 22 determines whether or not the authentication token is specified in the request header (S35). When the portion corresponding to the authentication token was taken out in S21, the control unit 22 determines that the authentication token is specified in the request header.

When the authentication token is not specified in the request header (No in S35), the control unit 22 returns permission error (403) to the client terminal 11 (S38).

When the authentication token is specified in the request header (Yes in S35), the control unit 22 determines whether or not the specified authentication token is right by inquiring of the authentication server (S36).

When the specified authentication token is not right (No in S36), the control unit 22 returns authentication error (401) to the client terminal 11 (S37). When the specified authentication token is right (Yes in S36), the control unit 22 returns API definition obtainment failure error (404) to the client terminal 11 (34). As described above, only when an API key or an authentication token is right, the control unit 22 returns to the client terminal 11 detailed error information, which represents the cause of the error.

When the API key is specified in the request header (Yes in S31), the control unit 22 determines whether or not the specified API key exists in the management DB (S32).

When the specified API key does not exist in the management DB (No in S32), the control unit 22 returns permission error (403) to the client terminal 11.

When the specified API key exists in the management DB (Yes in S32), the control unit 22 determines whether or not the authentication token is specified in the request header (S33). When the portion corresponding to the authentication token was taken out in S21, the control unit 22 determines that the authentication token is specified in the request header.

When the authentication token is not specified in the request header (No in S33), the control unit 22 returns API definition obtainment failure error (404) to the client terminal 11 (S34). As described above, only when an API key or an authentication token is right, the control unit 22 returns to the client terminal 11 detailed error information, which represents the cause of the error.

When the authentication token is specified in the request header (Yes in S33), the control unit 22 determines whether the specified authentication token is right by inquiring of the authentication server (S36).

When an "API definition obtainment failure error" was returned as a careless response in S37 or S38, information regarding whether or not the specified API name is right or wrong is returned to the attacker. By contrast, in the response by the present embodiment, a permission error or an authentication error is returned, making it possible to prevent provision of information regarding whether or not the specified API name is right to the attacker.

Note that because it is confirmed that the API key is right in S34, appropriate error information, which represents the cause of the error, is returned.

Figure 7:
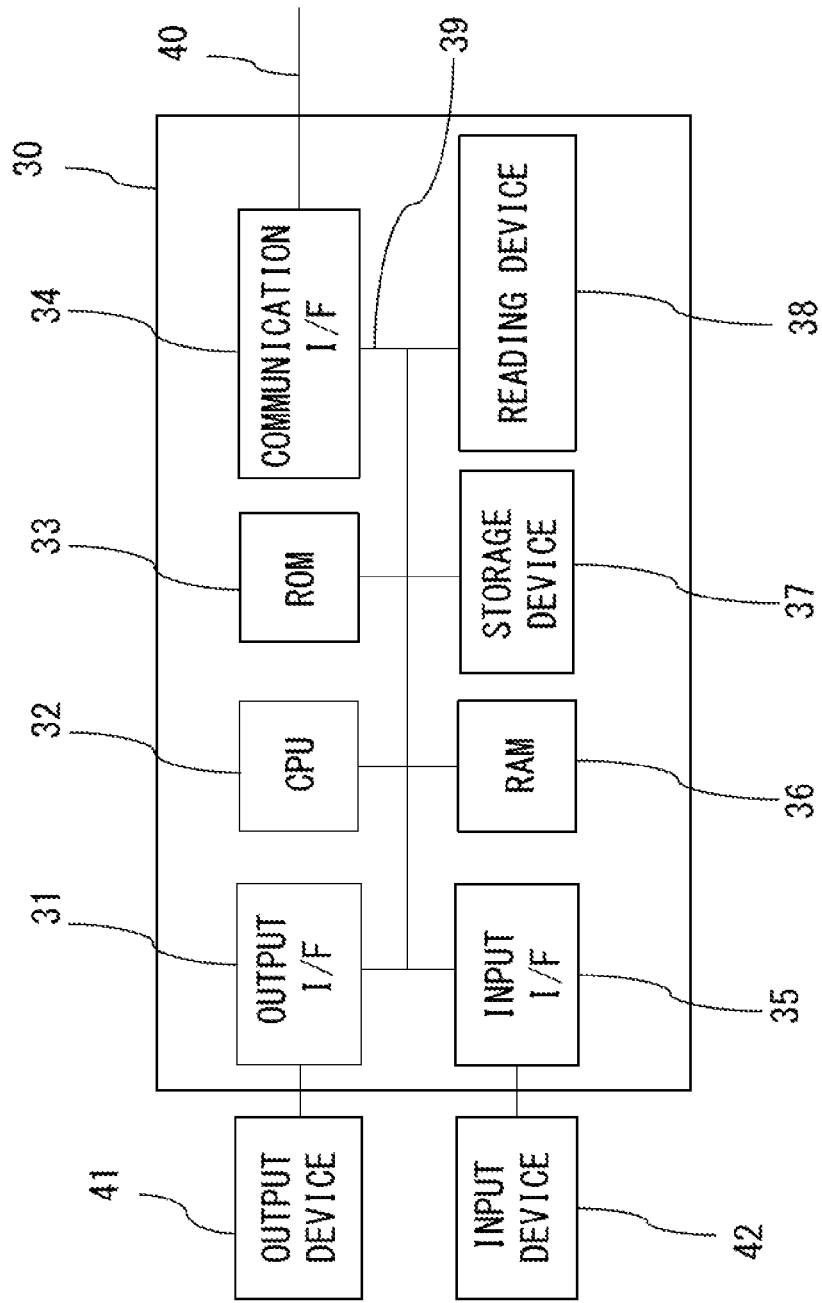
FIG. 7 is an example of a configuration block diagram of a hardware environment of a computer that executes a program according to the present embodiment.

FIG. 7 is an example of a configuration block diagram of a hardware environment of a computer that executes a program according to the present embodiment. The computer 30 functions as the intermediate server 12. The computer 30 includes a CPU 32, a ROM 33, a RAM 36, a communication I/F 34, a storage device 37, an output I/F 31, an input I/F 35, a reading device 38, a bus 39, an output device 41 and an input device 42.

In this example, "CPU" represents a central processing unit. "ROM" represents a read only memory. "RAM" represents a random access memory. "I/F" represents an interface. The CPU 32, the ROM 33, the RAM 36, the communication I/F 34, the storage device 37, the output I/F 31, the input I/F 35 and the reading device 38 are connected to the bus 39. The reading device 38 is a device for reading information from a portable recording medium. The output device 41 is connected to the output I/F 31. The input device 42 is connected to the input I/F 35.

As the storage device 37, a storage device of various types such as a hard disk, a flash memory card, etc. can be used. The storage device 37 or the ROM 33 stores a program according to the present embodiment for making the CPU 32 function as the determination performing unit 2 and the transmission unit 3.

The CPU 32 reads, as the control unit 22, a program according to the present embodiment from the storage device 37 or the ROM 33 so as to execute the program.

The communication I/F 34 is an interface such as a port etc. for providing communications with other devices through connection to a network.

A program that implements the processes explained in the above embodiment may be provided from the program providing side via a communication network 70 and the communication I/F 34 so as to be stored in for example the storage device 37. Also, a program that implements the processes explained in the above embodiment may be stored in a commercially available portable storage medium. In such a case, that portable storage medium may be set in the reading device 38 and have its program read by the CPU 32 so that it is executed. As the portable storage medium, a storage medium of various types such as a CD-ROM, a flexible disk, an optical disk, a magneto-optical disk, an IC card, a USB memory device, a semiconductor memory card, etc. can be used. Programs stored in a storage medium such as above is read by the reading device 38.

As the input device 42, a keyboard, a mouse, an electron camera, a web camera, a microphone, a scanner, a sensor, a tablet, a touch panel, etc. can be used. Also, as the output device 41, a display device, a printer, a speaker, etc. can be used.

The network 40 may be a communication network such as the Internet, a LAN, a WAN, a dedicated line, a wired network, a wireless network, etc.

The present embodiment can prevent careless response information from being returned in response to an unauthenticated access made to the intermediate server 12. This can suppress exposure of information advantageous to the attacker regarding unauthenticated accesses.

Note that the scope of the present invention is not limited to the above described embodiments, and can employ various configurations or embodiments without departing from the spirit of the present invention.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an authentication control program for causing a computer to execute a process comprising:

performing a first determination process in which when request information requesting a function of application software or utilization of an interface that calls data is received, validity of the request information is determined on the basis of identification information of the interface included in the request information and a second determination process in which validity of the request information is determined on the basis of key information that is key information or authentication token information for an interface included in the request information and that permits, regarding an application to utilize the interface, a user who made the application to utilize the interface or the authentication token information that determines validity of the user or any combination thereof;

transmitting, to a transmission source of the request information, first error information that includes information for identifying a cause of an error when the request information is determined to be invalid by the first determination process but the request information is determined to be valid by the second determination process; and transmitting, to the transmission source, second error information that does not include information for identifying a cause of an error and that represents only a fact that an access is not allowed when the request information is determined to be invalid by the first determination process and the request information is determined to be invalid also by the second determination process.

2. An authentication control device comprising:

a processor configured to perform a first determination process in which when request information requesting a function of application software or utilization of an interface that calls data is received, validity of the request information is determined on the basis of identification information of the interface included in the request information and a second determination process in which validity of the request information is determined on the basis of key information that is key information or authentication token information for an interface included in the request information and that permits, regarding an application to utilize the interface, a user who made the application to utilize the interface or the authentication token information that determines validity of the user or any combination thereof; and a transmitter configured to transmit, to a transmission source of the request information, first error information that includes information for identifying a cause of an error when the request information is determined to be invalid by the first determination process but the request information is determined to be valid by the second determination process, and transmit, to the transmission source, second error information that does not include information for identifying a cause of an error and that represents only a fact that an access is not allowed when the request information is determined to be invalid by the first determination process and the request information is determined to be invalid also by the second determination process.

3. An authentication control method comprising:

performing, by using a computer, a first determination process in which when request information requesting a function of application software or utilization of an interface that calls data is received, validity of the request information is determined on the basis of identification information of the interface included in the request information and a second determination process in which validity of the request information is determined on the basis of key information that is key information or authentication token information for an interface included in the request information and that permits, regarding an application to utilize the interface, a user who made the application to utilize the interface or the authentication token information that determines validity of the user or any combination thereof;

transmitting, by using the computer to a transmission source of the request information, first error information that includes information for identifying a cause of an error when the request information is determined to be invalid by the first determination process but the request information is determined to be valid by the second determination process; and transmitting, by using the computer to the transmission source, second error information that does not include information for identifying a cause of an error and that represents only a fact that an access is not allowed when the request information is determined to be invalid by the first determination process and the request information is determined to be invalid also by the second determination process.

\* \* \* \* \*